Patented July 27, 1954

2,684,919

UNITED STATES PATENT OFFICE 2,684,919

PRODUCTION OF MOISTUREPROOF FILMS

William Berry, Durleigh, Bridgwater, Somerset, and Charles Robert Oswin, Burrington, Somerset, England, and John Boyd, Prestwick, Scotland, assignors to British Cellophane Limited, Bridgwater, Somerset, England, a British company No Drawing. Application February 12, 1951,
Serial No. 210,632

Claims priority, application Great Britain
February 20, 1950

20 Claims. (Cl. 117—76)

This invention consists in improvements in or relating to the production of moistureproof films.

Vinylidene chloride polymers and copolymers offer advantages as surface coatings in the production of moistureproof films, because of the exceptionally good water-vapour resisting properties of these polymers and copolymers. Polymerisation of monomeric vinylidene chloride, or of the mixture of copolymerisable monomers, is carried out preferably in aqueous emulsion, since this provides the best known means of controlling the composition and chain-length of the resulting polymer.

An outstanding problem in the utilisation of vinylidene chloride polymers and copolymers as surface coatings for films of water-sensitive, non-fibrous, organic materials, to be used, for example, as sheet wrapping materials, has been to secure the coatings firmly to the base films.

Sheet material has already been proposed which comprises a hydrophilic sheet or film having a moistureproof surface coating thereon comprising a polymer of vinylidene chloride or a copolymer of vinylidene chloride and a minor proportion of vinyl chloride copolymer, and a water-resisting intermediate coating, for example a coating of a thermosetting resin such as urea/formaldehyde resin, disposed between said sheet or film and said moistureproof surface coating, to anchor the surface coating to the hydrophilic base sheet or film.

It is obviously wasteful to prepare the solid polymer or copolymer from emulsion and then to return it to a liquid form by dissolution in a volatile organic solvent for reshaping. However, attempts to produce anchored moistureproof film, by applying an aqueous emulsion of vinylidene chloride polymer or copolymer to regenerated cellulose film impregnated with urea/formaldehyde resin in the hardened, insoluble state, brought about by curing by heat in situ in the presence of an acid catalyst, have yielded unsatisfactory results, particularly in respect of weak anchorage.

One of the objects of the present invention is to provide moistureproof film, comprising a water-sensitive, non-fibrous organic base film and a moistureproofing surface coating of vinylidene chloride polymer or copolymer, which adheres tenaciously to the base film and which remains united to the base film even when the moistureproof film is maintained for long periods of time in direct contact with water or moisture or with products containing large amounts of water or moisture.

It is known to apply synthetic resin to base film from an aqueous medium. The aqueous medium to be applied to cellulosic base film may comprise a dilute aqueous dispersion of a partially condensed, water-dispersible urea/formaldehyde resin. Particles of partially condensed urea/formaldehyde resin dispersed in an aqueous medium are of colloidal dimensions and carry an electric charge. Moreover, films of many water-sensitive, non-fibrous, organic materials, such as regenerated cellulose and gelatine, develop an electric charge when immersed in an aqueous medium.

According to the present invention, there is provided a process for the production of a moistureproof film, which process comprises applying to a base film of water-sensitive, non-fibrous, organic material a partially condensed, hydrophilic urea/formaldehyde resin from a neutral aqueous dispersion, as hereinafter defined, drying the treated film without curing the applied resin to the hydrophobic state, and then, while the applied resin is still in the hydrophilic state, applying to the dried film an acidic aqueous dispersion, as hereinafter defined, of vinylidene chloride polymer or copolymer, and finally heating to evaporate the water, to cure the applied resin to the hydrophobic state, and to consolidate the surface coating. The surface coating thus formed is smooth and transparent, and is anchored securely to the base film.

By the expression "neutral aqueous dispersion," as used in the present specification, is to be understood an aqueous dispersion the aqueous phase of which has a pH value lying within the range between 5 and 8 inclusive, and by the expression "acidic aqueous dispersion," as used in the present specification, is to be understood an aqueous dispersion the aqueous phase of which has a pH value lying within the range between 1 and 4 inclusive.

Water-sensitive films are characterised in that they absorb water when they are brought into contact with water or water-vapour.

The invention includes moistureproof film whenever produced by the process in accordance with the invention.

Preferably, the neutral aqueous dispersion is such that the partially condensed urea/formaldehyde resin colloidal particles thereof carry an electric charge of opposite sign to that of the electric charge developed by the base film in contact with water.

The charge developed by films of water-sensitive, non-fibrous cellulosic material, such as films of regenerated cellulose, when immersed in water, is normally of negative sign. Films of water-sensitive, non-fibrous cellulosic material which develop a positive charge on immersion in water may, however, be produced by treatment of the film of cellulosic material, after formation, with a dilute aqueous solution, e. g. a 1% solution, of a cationic surface-active agent, such as cetyl trimethyl ammonium bromide or cetyl pyridinium bromide.

As normally made, by reacting urea and formaldehyde in aqueous solution for about an hour at 98° C. at a pH of about 5 in the absence of added surface-active agent, hydrophilic colloidal particles of partially condensed urea/formaldehyde resin, dispersed in an aqueous medium, carry a negative charge, and the dispersion is thus suitable for application to gelatine films, or to regenerated cellulose films which have been treated with a cationic surface-active agent. The production of aqueous dispersions of partially condensed urea/formaldehyde resins, the colloidal particles of which carry a positive electric charge, is described in United States specification Serial No. 120,822.

A suitable ratio of the urea to the formaldehyde used in the preparation of a urea/formaldehyde resin for use in the present invention lies between 1 mol of urea to 2.0 to 3.0 mols of formaldehyde.

The vinylidene chloride copolymer may be a copolymer of vinylidene chloride with one or more of the following substances copolymerisable therewith; acrylonitrile, vinyl chloride, vinyl acetate, styrene, ethyl acrylate, methyl methacrylate, and n-butyl methacrylate. Vinylidene chloride/acrylonitrile copolymers, made by polymerising a mixture of monomeric vinylidene chloride and monomeric acrylonitrile in a ratio lying within the range between 98/2 and 70/30, and vinylidene chloride/vinyl chloride copolymers, made by polymerising a mixture of monomeric vinylidene chloride and monomeric vinyl chloride, in a ratio lying within the range between 80/20 and 35/65, are preferred. The production of aqueous dispersions of vinylidene chloride/acrylonitrile copolymers is described in United States specification Serial No. 12,564. Long-chain alkyl sulphates may likewise be employed as dispersing agents. The dispersion after formation, is acidified to a pH value lying within the range between 1 and 4 inclusive by the addition of an acid or an acid-yielding substance, e. g. citric, acetic, or hydrochloric acid, or sulphur dioxide, or by ageing the dispersion under conditions which favour the hydrolytic evolution of hydrochloric acid from the polymer.

The dispersion containing the partially condensed urea/formaldehyde resin may be applied to the base film of water-sensitive non-fibrous organic material by dipping or immersing the film in the dispersion, or by spraying or brushing the dispersion on to the film, or by applying it to the film by rollers, or by any other convenient means. The excess of dispersion may be removed from the surface of the film by squeeze rolls, or by any other means to secure the desired concentration of resin in the film. In the preferred form of the invention, the resin is applied to regenerated cellulose film while the latter is in the gel state. By the expression the "gel state" as employed in this specification and in the appended claims is meant the swollen water-containing state which the films initially possess when coagulated in manufacture before they are dried, or at any rate while they still remain swollen prior to being dried. The resin may be applied to regenerated cellulose film by passing the film, as it comes from the casting machine, through an aqueous impregnating bath containing, in neutral aqueous dispersion (as hereinabove defined), urea/formaldehyde resin in the partially condensed, hydrophilic state, and containing in solution a known softening agent for regenerated cellulose, e. g. glycerol.

The treated film is next dried, for example by passage over drying rollers heated to a temperature or temperatures lying within the range between 65° C. and 100° C. When the aqueous resin dispersion is neutral (as hereinabove defined), the applied partially condensed, hydrophilic resin is not cured to the hydrophobic state by heat during a drying operation at temperatures of 65° C. to 100° C. for normal drying periods of up to 5 minutes duration.

The layer of urea/formaldehyde resin, formed in and upon the base film of water-sensitive, non-fibrous, organic material, is usually extremely thin, the proportion of the resin formed upon the base film being of the order of one to two per cent based on the weight of the oven-dry film.

In the preferred procedures, the acidic aqueous dispersion (as hereinabove defined) of vinylidene chloride polymer or copolymer is applied to the dried film, as base, in a layer of such thinness that the water thereof is wholly absorbed by the base film, and the dispersed polymer or copolymer thereof coalesces to form a surface coating.

The aqueous dispersion of vinylidene chloride polymer or copolymer may be applied to the base film in conventional manner and with existing equipment. However, the process described in United States specification Serial No. 120,573 for applying a moistureproof layer of vinylidene chloride/acrylonitrile copolymer to the surface of a film of water-sensitive organic, non-fibrous material is preferred.

The film is finally heated, e. g. by radiant heating elements spaced at each side of the film, to evaporate excess water, to cure the applied resin in the presence of the acid of the acidic aqueous dispersion (as hereinabove defined) of vinylidene chloride polymer or copolymer to the hydrophobic state, and to consolidate the surface coating.

Specific methods of carrying the invention into effect will now be described, by way of illustration, with reference to the following examples.

In the present specification, it should be understood that the term "urea," except in the specific examples, includes also the term "thiourea," and that the term "urea/formaldehyde resin" includes also "urea/formaldehyde/aliphatic alcohol resin."

Parts and proportions referred to in this specification are parts and proportions by weight.

Example I

A neutral aqueous dispersion (as hereinabove defined) of partially condensed urea/formaldehyde resin was produced by heating together the following ingredients for 1 hour at 98° C. under reflux:

|  | Parts |
|---|---|
| Urea | 23.7 |
| Formalin (39% aqueous solution of formaldehyde) | 73.9 |
| Sodium acetate | 0.8 |
| Cetyl trimethyl ammonium bromide (50% paste) | 1.6 | brought to pH 5.0 by the addition of glacial acetic acid. The aqueous resin dispersion, so formed, was cooled and then carefully neutralised to pH 7 by the addition of 10% aqueous caustic soda solution.

Purified gel regenerated cellulose film (thickness when dry 0.0009″), produced in the known way from viscose, was passed through an aqueous bath having a temperature of 20° C., and having the following composition:

| | Parts |
|---|---|
| Glycerol | 10 |
| Aqueous dispersion of partially condensed urea/formaldehyde resin, as above | 1 |
| Water | 89 | in such a way that the film was in contact with the aqueous bath for a period of 30 seconds, and thence between squeeze rolls, whereby excess liquid was expressed. The colloidal particles of partially condensed urea/formaldehyde resin of the dispersion carried an electric charge of positive sign, and the gel regenerated cellulose film developed, in contact with the bath, an electric charge of negative sign. The treated film was dried by passage, for a period of 3 minutes, over rotating drying rollers heated to a temperature of between 80° C. and 95° C. to produce a film containing about 2% resin and 20% glycerol, based upon the weight of the oven-dried film.

To the dried film was applied an acidic aqueous dispersion (as hereinabove defined) of vinylidene chloride copolymer made from a mixture having the following composition:

| | Parts |
|---|---|
| Vinylidene chloride monomer | 90 |
| Acrylonitrile monomer | 10 |
| Ammonium octadecyl sulphate | 1 |
| Ammonium persulphate | 0.4 |
| Sodium metabisulphite | 0.2 |
| Water | 200 |

The mixture was introduced into a flask from which air had been swept by carbon dioxide, and was emulsified by stirring under reflux. Copolymerisation was effected by maintaining the emulsion at a temperature of 45° C. for a period of 75 minutes, and the aqueous dispersion of the copolymer was then allowed to cool to room temperature. The aqueous copolymer dispersion was aged for 2 days, and was then acidified with citric acid to pH 2.5.

All of the water of the dispersion was absorbed almost immediately by the base film, and the applied dispersion readily coalesced to form a uniform, smooth, transparent coating. Since excess water had been added to the base film in the coating step, it next became necessary to remove some of this water, to obtain a final product having a desired low water content. This was accomplished by exposing the freshly coated film to air at 130° C. for about 12 seconds, whereby water was evaporated, the applied resin cured to the hydrophobic state, and the copolymer surface coating consolidated to a continuous layer.

The product was a transparent, moistureproofed regenerated cellulose film. The moistureproof film had a permeability value of 140, and the moistureproofing surface coating was retained tenaciously by the base film, even when in direct contact with water for prolonged periods of time, for example in direct contact with boiling water for a period of 15 minutes.

Example II

Moistureproof film was prepared in the way described in Example I, except that the neutral aqueous dispersion of partially condensed urea/formaldehyde resin was replaced by the neutral aqueous dispersion (as hereinabove defined) of partially condensed thiourea/formaldehyde resin produced by heating together the following ingredients for 1 hour at 98° C. under reflux:

| | Parts |
|---|---|
| Thiourea | 24.3 |
| Formalin (39% aqueous solution of formaldehyde) | 73.1 |
| Sodium acetate | 0.7 |
| Cetyl trimethyl ammonium bromide (50% paste) | 1.6 | brought to pH 5.0 by the addition of glacial acetic acid. The aqueous resin dispersion, so formed, was cooled and then carefully neutralised to pH 7 by the addition of 10% aqueous caustic soda solution.

The colloidal particles of partially condensed thiourea/formaldehyde resin of the dispersion carried an electric charge of positive sign, and the gel regenerated cellulose film developed, in contact with the bath, an electric charge of negative sign.

The product was transparent, moistureproof regenerated cellulose film, having properties similar to those of the film described in Example I.

Example III

Moistureproof film was prepared in the way described in Example I, except that the neutral aqueous dispersion of partially condensed urea/formaldehyde resin was replaced by the neutral aqueous dispersion (as hereinabove defined) of partially condensed urea/formaldehyde/aliphatic alcohol resin, produced by heating together the following ingredients for 1 hour at 98° C. under reflux:

| | Parts |
|---|---|
| Urea | 19.5 |
| Formalin (37% aqueous solution of formaldehyde | 60.5 |
| Ethanol | 16.0 |
| Sodium acetate | 0.5 |
| Cetyl trimethyl ammonium bromide (50% paste) | 3.5 | brought to pH 5.0 by the addition of glacial acetic acid. The aqueous resin dispersion, so formed, was cooled and then carefully neutralised to pH 7 by the addition of 10% aqueous caustic soda solution.

The colloidal particles of partially condensed urea/formaldehyde/aliphatic alcohol resin of the dispersion carried an electric charge of positive sign, and the gel regenerated cellulose film developed, in contact with the bath, an electric charge of negative sign.

The product was transparent, moistureproof regenerated cellulose film, having properties similar to those of the film described in Example I.

Example IV

Purified gel regenerated cellulose film (thickness when dry 0.0009″), produced in the known way from viscose, was impregnated with partially condensed urea/formaldehyde resin, and dried, in the way described in Example I.

To the dried film was applied an acidic aqueous dispersion made from a mixture having the following composition:

| | Parts |
|---|---|
| Vinylidene chloride monomer | 96 |
| Methyl methacrylate | 4 |
| Dispersing agent | 3 |
| Ammonium persulphate | 0.6 |
| Sodium metabisulphite | 0.3 |
| Water | 160 |

The dispersing agent was a 30% aqueous solution of a condensation product of formaldehyde with naphthalene sulphonic acid.

Copolymerisation took 4 hours at 38°. The dispersion was cooled to 18° C., and was acidified to pH 3 with hydrochloric acid.

After application of the acidic aqueous dispersion, excess water was removed from the film by evaporation by heat, and the coating was coalesced by heating, to form a smooth uniform coating.

The product was a transparent, moistureproof film, carrying 15% of its weight of copolymer. The moistureproof film had a permeability value of 60, and the moistureproofing surface coating was retained tenaciously by the base film, even when in direct contact with water for prolonged periods of time, for example in direct contact with boiling water for a period of 12 minutes.

By the term "anchor," or equivalent term used herein, is meant the securing of the surface coating to the base film, to the end that the coating will not loosen, slough, or flake from the base film, even when the coated sheet or film is subjected to a wide range of temperature and humidity conditions (up to 100% relative humidity) for appreciable and substantial periods of time, e. g. for at least 10 minutes when immersed in water at 100° C. or for at least 7 days when immersed in water at 20° C.

The permeability value was determined by the method of Charch and Scroggie for measuring "permeability," as described in Paper Trade Journal TAPPI Section, October 3, 1935, pages 201–209.

It is to be understood that the term "film" is used herein in the general sense to include films, sheet and like materials.

We claim:

1. A process for the production of a moistureproof film, which process comprises applying to a base film of water-sensitive, non-fibrous, organic material a partially condensed, hydrophilic urea/formaldehyde resin from a neutral aqueous dispersion having a pH value lying within the range between 5 and 8 inclusive, drying the treated film without curing the applied resin to the hydrophobic state, and then, while the applied resin is still in the hydrophilic state, applying to the dried film an acidic aqueous dispersion the aqueous phase of which has a pH value lying within the range between 1 and 4 inclusive, of a substance selected from the group consisting of vinylidene chloride polymer and vinylidene chloride copolymer, and finally heating to evaporate the water, to cure the applied resin to the hydrophobic state, and to consolidate the surface coating.

2. A process as claimed in claim 1, in which the ratio of the urea to the formaldehyde used in the preparation of the urea/formaldehyde resin lies between 1 mol of urea to 2.0 to 3.0 mols of formaldehyde.

3. A process as claimed in claim 1, in which the vinylidene chloride copolymer is a copolymer of vinylidene chloride with at least one substance selected from the group consisting of, acrylonitrile, vinyl chloride, vinyl acetate, styrene, ethyl acrylate, methyl methacrylate and n-butyl methacrylate.

4. A process as claimed in claim 1, in which the vinylidene chloride copolymer is a vinylidene chloride/acrylonitrile copolymer, made by polymerising a mixture of monomeric vinylidene chloride and monomeric acrylonitrile in a ratio lying within the range between 98/2 and 70/30.

5. A process as claimed in claim 1, in which the vinylidene chloride copolymer is a vinylidene chloride/vinyl chloride copolymer, made by polymerising a mixture of monomeric vinylidene chloride and monomeric vinyl chloride in a ratio lying within the range between 80/20 and 35/65.

6. A process as claimed in claim 1, in which the acid aqueous dispersion of the substance selected from the group consisting of vinylidene chloride polymer and vinylidene chloride copolymer is applied to the dried film, as base, in a layer of such thinness that the water thereof is wholly absorbed by the base film, and the dispersed substance thereof coalesces to form a surface coating.

7. A process for the production of a moistureproof film, which process comprises applying to a base film of water-sensitive, hygroscopic, non-fibrous cellulosic material a partially condensed, hydrophilic urea/formaldehyde resin from a neutral aqueous dispersion having a pH value lying within the range between 5 and 8 inclusive, drying the treated film without curing the applied resin to the hydrophobic state, and then, while the applied resin is still in the hydrophilic state, applying to the dried film an acidic aqueous dispersion the aqueous phase of which has a pH value lying within the range between 1 and 4 inclusive, of a substance selected from the group consisting of vinylidene chloride polymer and vinylidene chloride copolymer, and finally heating to evaporate the water, to cure the applied resin to the hydrophobic state, and to consolidate the surface coating.

8. A process as claimed in claim 7, wherein the neutral aqueous dispersion is such that the partially condensed urea/formaldehyde resin colloidal particles thereof carry an electric charge of opposite sign to that of the electric charge developed by the base film in contact with water.

9. A process as claimed in claim 8 wherein the electric charge carried by the colloidal particles of the partially condensed urea/formaldehyde resin is of positive sign, and the electric charge developed by the base film in contact with water is of negative sign.

10. A process as claimed in claim 7, in which the ratio of the urea to the formaldehyde used in the preparation of the urea/formaldehyde resin lies between 1 mol of urea to 2.0 to 3.0 mols of formaldehyde.

11. A process as claimed in claim 7 in which the vinylidene chloride copolymer is a copolymer of vinylidene chloride with at least one substance selected from the group consisting of, acrylonitrile, vinyl chloride, vinyl acetate, styrene, ethyl acrylate, methyl methacrylate and n-butyl methacrylate.

12. A process as claimed in claim 7 in which the acid aqueous dispersion of the substance selected from the group consisting of vinylidene chloride polymer and vinylidene chloride copolymer is applied to the dried film, as base, in a layer of such thinness that the water thereof is wholly absorbed by the base film, and the dispersed substance thereof coalesces to form a surface coating.

13. A process for the production of a moisture-proof film, which process comprises applying to a base film of regenerated cellulose a partially condensed, hydrophilic urea/formaldehyde resin from a neutral aqueous dispersion having a pH value lying within the range between 5 and 8 inclusive, drying the treated film without curing the applied resin to the hydrophobic state, and then, while the applied resin is still in the hydrophilic state, applying to the dried film an acidic aqueous dispersion the aqueous phase of which has a pH value lying within the range between 1 and 4 inclusive, of a substance selected from the group consisting of vinylidene chloride polymer and vinylidene chloride copolymer, and finally heating to evaporate the water, to cure the applied resin to the hydrophobic state, and to consolidate the surface coating.

14. A process as claimed in claim 13, wherein the neutral aqueous dispersion is such that the partially condensed urea/formaldehyde resin colloidal particles thereof carry an electric charge of opposite sign to that of the electric charge developed by the base film in contact with water.

15. A process as claimed in claim 14 wherein the electric charge carried by the colloidal particles of the partially condensed urea/formaldehyde resin is of positive sign, and the electric charge developed by the base film in contact with water is of negative sign.

16. A process as claimed in claim 13, in which the ratio of the urea to the formaldehyde used in the preparation of the urea/formaldehyde resin lies between 1 mol of urea to 2.0 to 3.0 mols of formaldehyde.

17. A process as claimed in claim 13, in which the vinylidene chloride copolymer is a copolymer of vinylidene chloride with at least one substance selected from the group consisting of, acrylonitrile, vinyl chloride, vinyl acetate, styrene, ethyl acrylate, methyl methacrylate and n-butyl methacrylate.

18. A process as claimed in claim 13, in which the vinylidene chloride copolymer is a vinylidene chloride/acrylonitrile copolymer, made by polymerising a mixture of monomeric vinylidene chloride and monomeric acrylonitrile in a ratio lying within the range between 98/2 and 70/30.

19. A process as claimed in claim 13, in which the vinylidene chloride copolymer is a vinylidene chloride/vinyl chloride copolymer, made by polymerising a mixture of monomeric vinylidene chloride and monomeric vinyl chloride in a ratio lying within the range between 80/20 and 35/65.

20. A process as claimed in claim 13, in which the acid aqueous dispersion of the substance selected from the group consisting of vinylidene chloride polymer and vinylidene chloride copolymer is applied to the dried film, as base, in a layer of such thinness that the water thereof is wholly absorbed by the base film, and the dispersed substance thereof coalesces to form a surface coating.

References Cited in the file of this patent

UNITED STATES PATENTS

| Number | Name | Date |
| --- | --- | --- |
| 2,334,236 | Arnold | Nov. 16, 1943 |
| 2,533,557 | Chapman | Dec. 12, 1950 |
| 2,546,575 | Wooding | Mar. 27, 1951 |
| 2,549,220 | McLaren | Apr. 17, 1951 |
| 2,618,575 | Oswin | Nov. 18, 1952 |

FOREIGN PATENTS

| Number | Country | Date |
| --- | --- | --- |
| 590,698 | Great Britain | July 25, 1947 |